United States Patent
Wang

(10) Patent No.: US 10,618,416 B2
(45) Date of Patent: Apr. 14, 2020

(54) ELECTRIC VEHICLE, VEHICLE-MOUNTED CHARGER, AND METHOD FOR CONTROLLING THE SAME

(71) Applicant: BYD COMPANY LIMITED, Shenzhen (CN)

(72) Inventor: Xinghui Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 152 days.

(21) Appl. No.: 16/062,469

(22) PCT Filed: Dec. 16, 2016

(86) PCT No.: PCT/CN2016/110272
§ 371 (c)(1),
(2) Date: Jun. 14, 2018

(87) PCT Pub. No.: WO2017/101839
PCT Pub. Date: Jun. 22, 2017

(65) Prior Publication Data
US 2018/0361860 A1    Dec. 20, 2018

(30) Foreign Application Priority Data
Dec. 18, 2015    (CN) .......................... 2015 1 0955099

(51) Int. Cl.
*B60L 11/18* (2006.01)
*H02M 7/219* (2006.01)
(Continued)

(52) U.S. Cl.
CPC .......... *B60L 11/1812* (2013.01); *B60L 3/003* (2013.01); *B60L 53/14* (2019.02); *B60L 53/22* (2019.02);
(Continued)

(58) Field of Classification Search
CPC ..... B60L 11/1812; B60L 53/60; H02M 7/219; H02J 7/022
See application file for complete search history.

(56) References Cited

U.S. PATENT DOCUMENTS 5,963,440 A * 10/1999 Gibbs ................. H02H 7/1206
                                                                363/129
9,634,553 B2 * 4/2017 Roessler ................. B60L 3/003
(Continued)

FOREIGN PATENT DOCUMENTS

CN    101604923 A    12/2009
CN    101800472 A    8/2010
(Continued)

OTHER PUBLICATIONS

The World Intellectual Property Organization (WIPO) International Search Report and Written Opinion for PCT/CN2016/110272 dated Mar. 29, 2017 8 Pages.

*Primary Examiner* — Richard V Muralidar
(74) *Attorney, Agent, or Firm* — Anova Law Group, PLLC

(57) ABSTRACT

The present disclosure provides an electric vehicle, a vehicle-mounted charger and a method for controlling the same. The method includes: obtaining a first total charging period for controlling the H bridge in a first manner and a second total charging period for controlling the H bridge in a second manner when the vehicle-mounted charger starts to charge the power battery; determining a relation between the first total charging period and the second total charging period; and selecting a manner for controlling the H bridge according to the relation between the first total charging period and the second total charging period to perform temperature balanced control over the first switch tube, the second switch tube, the third switch tube and the fourth switch tube.

14 Claims, 7 Drawing Sheets

(51) Int. Cl.
*B60L 3/00* (2019.01)
*B60L 53/14* (2019.01)
*B60L 53/60* (2019.01)
*B60L 53/22* (2019.01)
*H02J 7/02* (2016.01)

(52) U.S. Cl.
CPC ............. *B60L 53/60* (2019.02); *H02J 7/022* (2013.01); *H02M 7/219* (2013.01); *B60L 2210/30* (2013.01); *B60L 2240/36* (2013.01); *B60L 2240/525* (2013.01); *Y02T 10/7005* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 10,236,679 B2* | 3/2019 | Yamada | ................. H02H 5/044 |
| 10,498,252 B2* | 12/2019 | Wang | .................... H02M 7/219 |
| 2015/0263646 A1 | 9/2015 | Hara et al. | |
| 2018/0319285 A1* | 11/2018 | Wang | ...................... B60L 3/003 |
| 2018/0370370 A1* | 12/2018 | Wang | ...................... B60L 3/003 |
| 2018/0370381 A1* | 12/2018 | Wang | ................... H02M 7/5395 |
| 2018/0375366 A1* | 12/2018 | Wang | ................... H02M 7/219 |
| 2019/0020216 A1* | 1/2019 | Wang | ................... H02M 1/4233 |

FOREIGN PATENT DOCUMENTS

| | | |
|---|---|---|
| CN | 102412719 A | 4/2012 |
| CN | 104600998 A | 5/2015 |
| CN | 204835609 U | 12/2015 |
| JP | H08126352 A | 5/1996 |
| JP | 2009171639 A | 7/2009 |
| JP | 2013046445 A | 3/2013 |
| JP | 2014171313 A | 9/2014 |
| KR | 97061007 A | 8/1997 |

* cited by examiner

ELECTRIC VEHICLE, VEHICLE-MOUNTED CHARGER, AND METHOD FOR CONTROLLING THE SAME

CROSS-REFERENCE TO RELATED APPLICATION

The present application is a national phase entry under 35 U.S.C. § 371 of International Application No. PCT/CN2016/110272, filed on Dec. 16, 2016, which is based on and claims priority to Chinese Patent Application Serial No. 201510955099.5 filed on Dec. 18, 2015, all content of all of which is hereby incorporated by reference in its entity.

FIELD

The present disclosure relates to the technical field of electric vehicles, in particular to a method for controlling a vehicle-mounted charger of an electric vehicle, a vehicle-mounted charger of an electric vehicle, and an electric vehicle.

BACKGROUND

Along with the commercialization progress of electric vehicles, a vehicle-mounted charger of the electric vehicles has become one of important components in the electric vehicles.

There are many methods for charging the whole vehicle and for discharging outwards from the whole vehicle via the vehicle-mounted charger. A monophase H bridge control method is mostly adopted in related arts, which includes a dual-polarity control method and a mono-polarity control method.

However, when the dual-polarity control method is adopted, 4 switch tubes in an H bridge are all in a high frequency ON/OFF state, resulting in higher switching loss and larger heat loss; when the mono-polarity control method is adopted, although the heat loss of the switch tubes that is generated when the dual-polarity control method is adopted can be solved to some extent, the four switch tubes in the H bridge are controlled according to a fixing manner during a charging process or a discharging process of the whole vehicle, some switch tubes in the H bridge need to be switched off with current, so that the overheat problem of the switch tubes switched off with current is not effectively solved.

Therefore, no matter the dual-polarity control method or the mono-polarity control method is adopted, the heating problem of the switch tubes in the H bridge cannot be effectively solved, and the service life of the switch tubes is affected.

SUMMARY

The present disclosure aims to solve at least one of the technical problems in the related art to some extent. For this purpose, a first objective of the present disclosure is to provide a method for controlling a vehicle-mounted charger of an electric vehicle, which is capable of enabling heating of a first switch tube, a second switch tube, a third switch tube and a fourth switch tube in an H bridge to be relatively balanced, and improving a service life of the switch tubes in the H bridge.

A second objective of the present disclosure is to provide a vehicle-mounted charger of an electric vehicle. A third objective of the present disclosure is to provide an electric vehicle.

For the above purpose, in one aspect of embodiments of the present disclosure, there is provided a method for controlling a vehicle-mounted charger of an electric vehicle. The vehicle-mounted charger includes an H bridge. The H bridge includes a first switch tube, a second switch tube, a third switch tube and a fourth switch tube. The method includes: obtaining a first total charging period for controlling the H bridge in a first manner and a second total charging period for controlling the H bridge in a second manner when the vehicle-mounted charger starts to charge a power battery; determining a relation between the first total charging period and the second total charging period; and selecting a manner for controlling the H bridge according to the relation between the first total charging period and the second total charging period to perform temperature balanced control over the first switch tube, the second switch tube, the third switch tube and the fourth switch tube.

According to the method for controlling a vehicle-mounted charger of an electric vehicle in embodiments of the present disclosure, when the power battery is charged by the vehicle-mounted charger every time, the first total charging period for controlling the H bridge in the first manner and the second total charging period for controlling the H bridge in the second manner are obtained; and the manner for controlling the H bridge is selected according to the relation between the first total charging period and the second total charging period, so as to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

For the above purpose, in another aspect of embodiments of the present disclosure, there is provided a vehicle-mounted charger of an electric vehicle, including: an H bridge, including a first switch tube, a second switch tube, a third switch tube and a fourth switch tube; and a controller, configured to obtain a first total charging period for controlling the H bridge in a first manner, and a second total charging period for controlling the H bridge in a second manner when the vehicle-mounted charger starts to charge the power battery; to determine a relation between the first total charging period and the second total charging period; and to select a manner for controlling the H bridge according to the relation between the first total charging period and the second total charging period to perform temperature balanced control over the first switch tube, the second switch tube, the third switch tube and the fourth switch tube.

According to the vehicle-mounted charger of an electric vehicle in embodiments of the present disclosure, when the power battery is charged by the vehicle-mounted charger every time, the controller is configured to obtain the first total charging period for controlling the H bridge in the first manner and the second total charging period for controlling the H bridge in the second manner; and to select the manner for controlling the H bridge according to the relation between the first total charging period and the second total charging period, so as to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

In addition, an embodiment of the present disclosure also provides an electric vehicle, including the vehicle-mounted charger of an electric vehicle.

According to the electric vehicle in embodiments of the present disclosure, when the power battery is charged by the above vehicle-mounted charger, the temperature balanced control over the first switch tube, the second switch tube, the third switch tube and the fourth switch tube in the H bridge can be realized, such that the heating of each switch tube is balanced, the service life of the switch tubes in the H bridge is prolonged, and thus the service period of the vehicle-mounted charger is prolonged.

DETAILED DESCRIPTION

Figure 1:
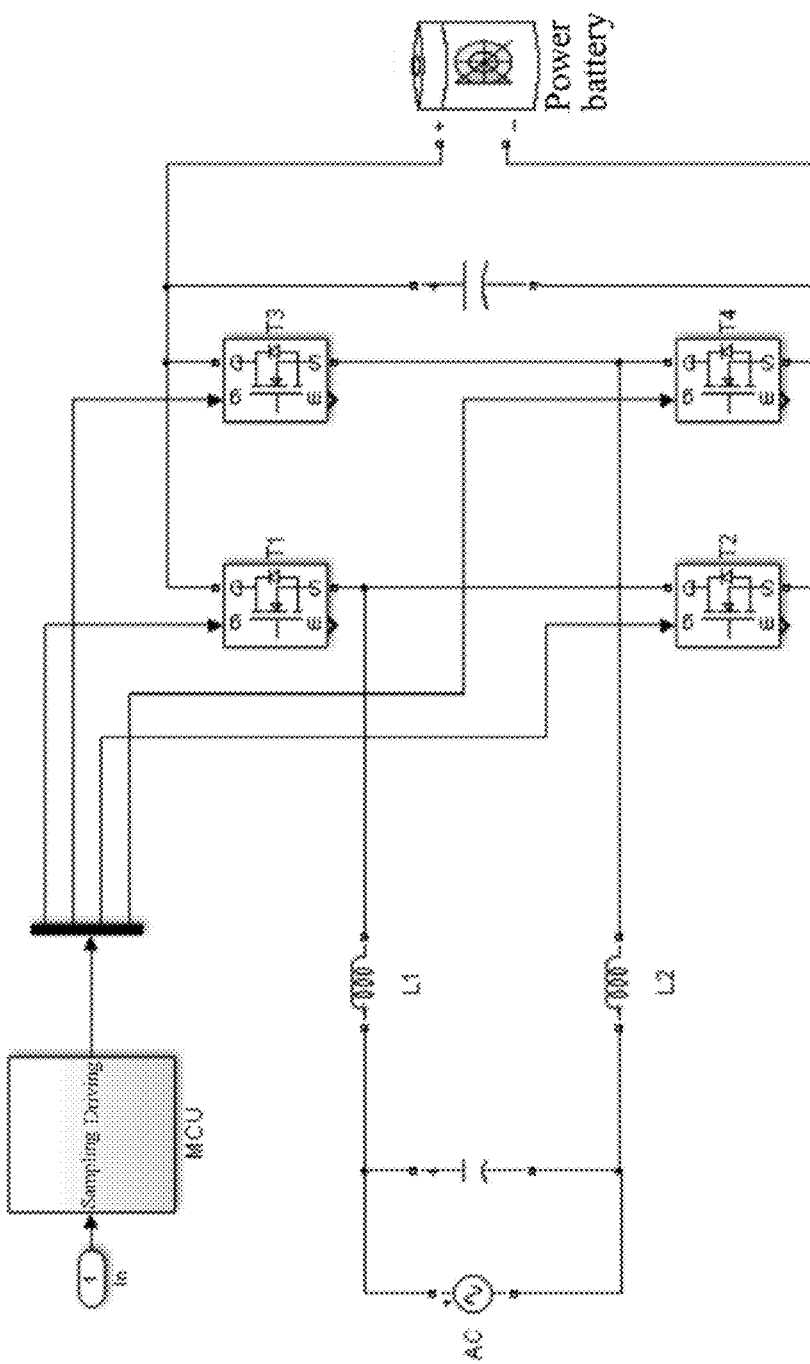
FIG. 1 is a circuit schematic diagram of a vehicle-mounted charger of an electric vehicle of an embodiment of the present disclosure.

The embodiments of the present disclosure are described in detail, examples of the embodiments are shown in the drawings, wherein, the same or similar numbers represent same or similar elements or elements having the same or similar functions from beginning to end. The embodiments described with reference to the drawings are exemplary, and aim to explain the present disclosure rather than understood as a limitation to the present disclosure.

The method for controlling a vehicle-mounted charger of an electric vehicle, a vehicle-mounted charger of an electric vehicle, and an electric vehicle with the vehicle-mounted charger, provided in embodiments of the present disclosure, are described with reference to the drawings as follows.

Figure 2:
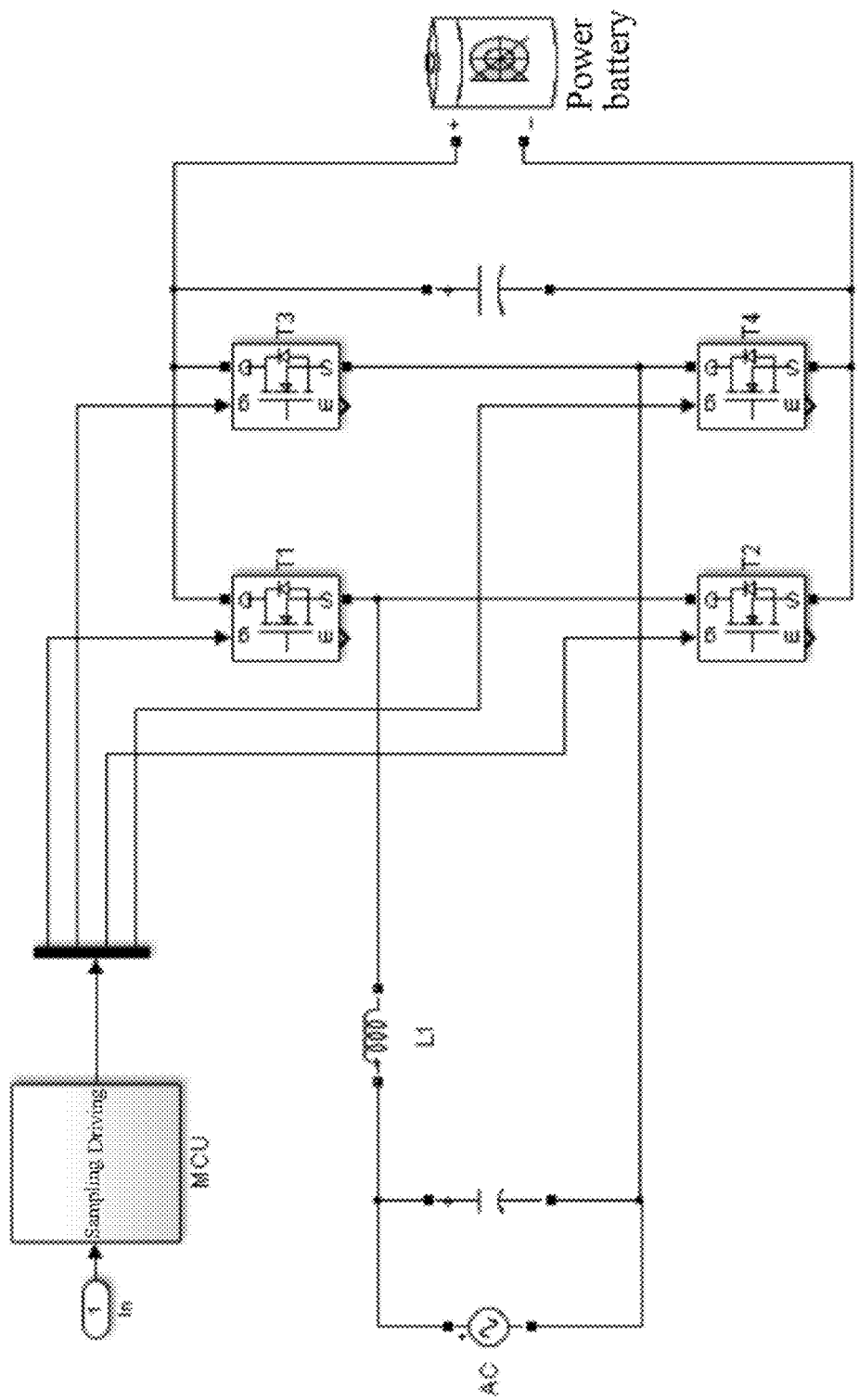
FIG. 2 is a circuit schematic diagram of a vehicle-mounted charger of an electric vehicle of another embodiment of the present disclosure.
Figure 3:
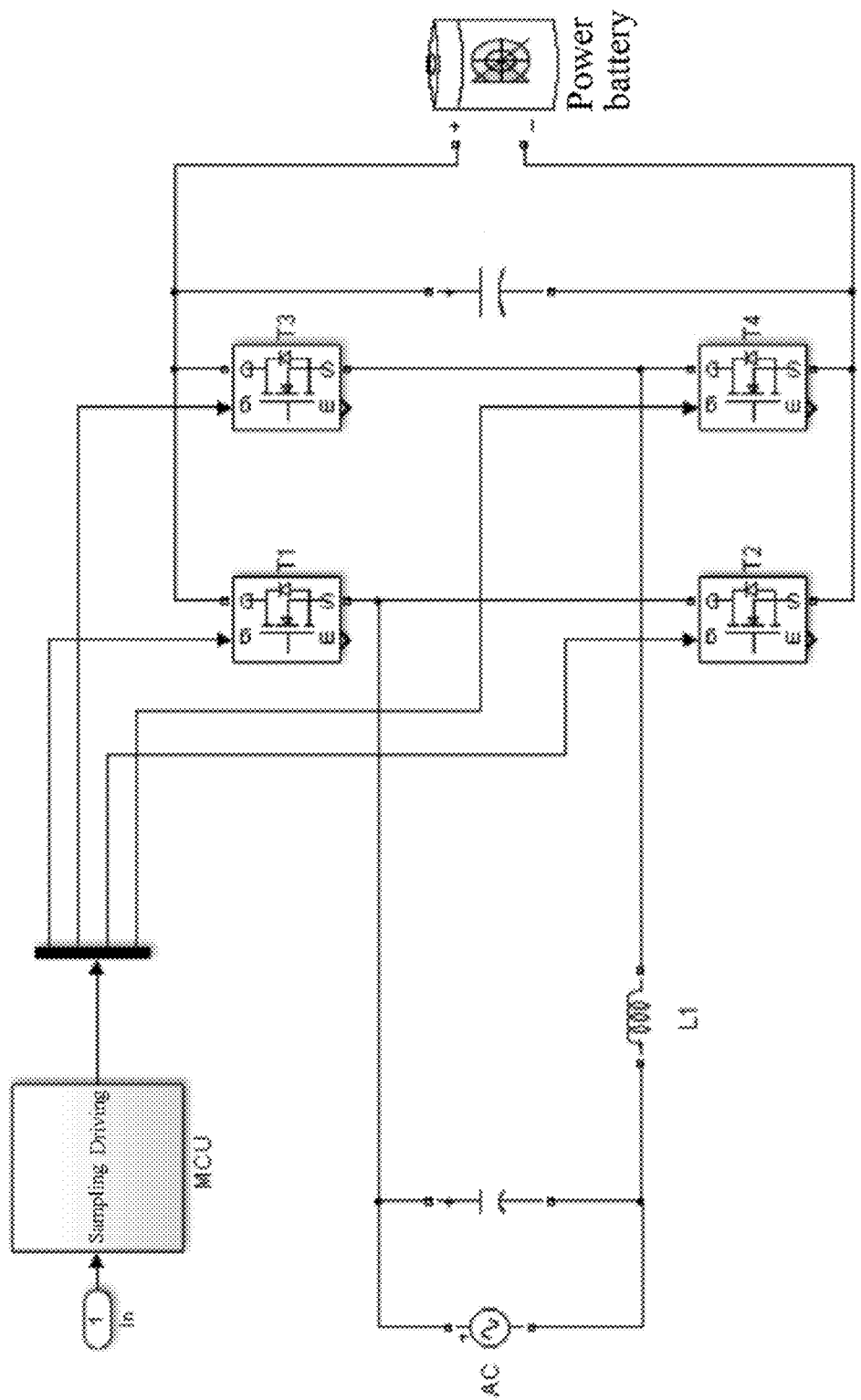
FIG. 3 is a circuit schematic diagram of a vehicle-mounted charger of an electric vehicle of still another embodiment of the present disclosure.

FIGS. 1 to 3 show a connecting manner of a vehicle-mounted charger of an electric vehicle according to an embodiment of the present disclosure. As shown in FIGS. 1 to 3, the vehicle-mounted charger of an electric vehicle according to embodiments of the present disclosure includes an H bridge. The H bridge includes a first switch tube T1, a second switch tube T2, a third switch tube T3 and a fourth switch tube T4. The vehicle-mounted charger of an electric vehicle as shown in FIG. 1 includes a first inductor L1 and a second inductor L2, in which a first end of the first inductor L1 is connected to one end of a load or an anode end of an alternating current power grid AC, and a first end of the second inductor L2 is connected to the other end of the load or a cathode end of the alternating current power grid AC, and a second end of the first inductor L1 and a second end of the second inductor L2 are connected to the H bridge. The vehicle-mounted charger of an electric vehicle as shown in FIG. 2 merely includes an inductor, for example, the inductor L1, in which a first end of the first inductor L1 is connected to one end of a load or an anode end of an alternating current power grid AC, and a second end of the first inductor L1 is connected to the H bridge. The vehicle-mounted charger of an electric vehicle as shown in FIG. 3 merely includes an inductor, for example, the first inductor L1, in which a first end of the first inductor L1 is connected to the other end of the load or a cathode end of the alternating current power grid AC, and a second end of the first inductor L1 is connected to the H bridge.

Figure 4:
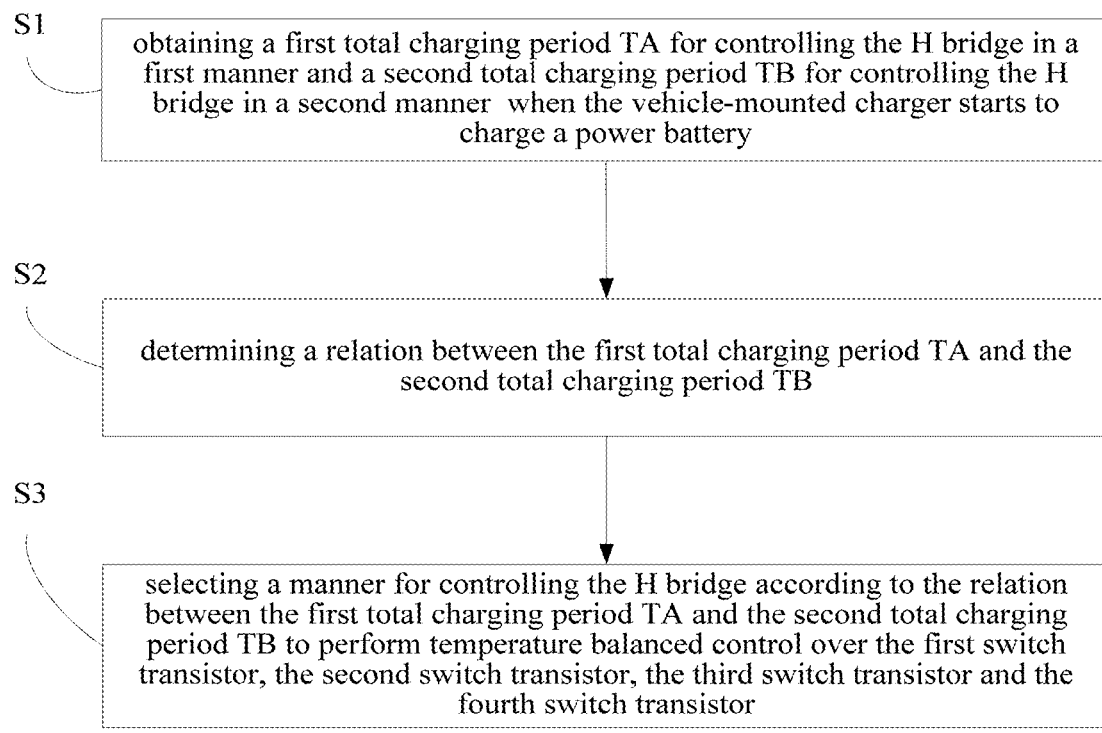
FIG. 4 is a flow chart of a method for controlling a vehicle-mounted charger of an electric vehicle of an embodiment of the present disclosure.

FIG. 4 is a flow chart of a method for controlling a vehicle-mounted charger of an electric vehicle according to an embodiment of the present disclosure. As shown in FIG. 4, the method for controlling a vehicle-mounted charger of an electric vehicle in an embodiment of the present disclosure includes followings.

At step S1, a first total charging period TA for controlling the H bridge in a first manner and a second total charging period TB for controlling the H bridge in a second manner are obtained, when the vehicle-mounted charger starts to charge the power battery.

Figure 5:
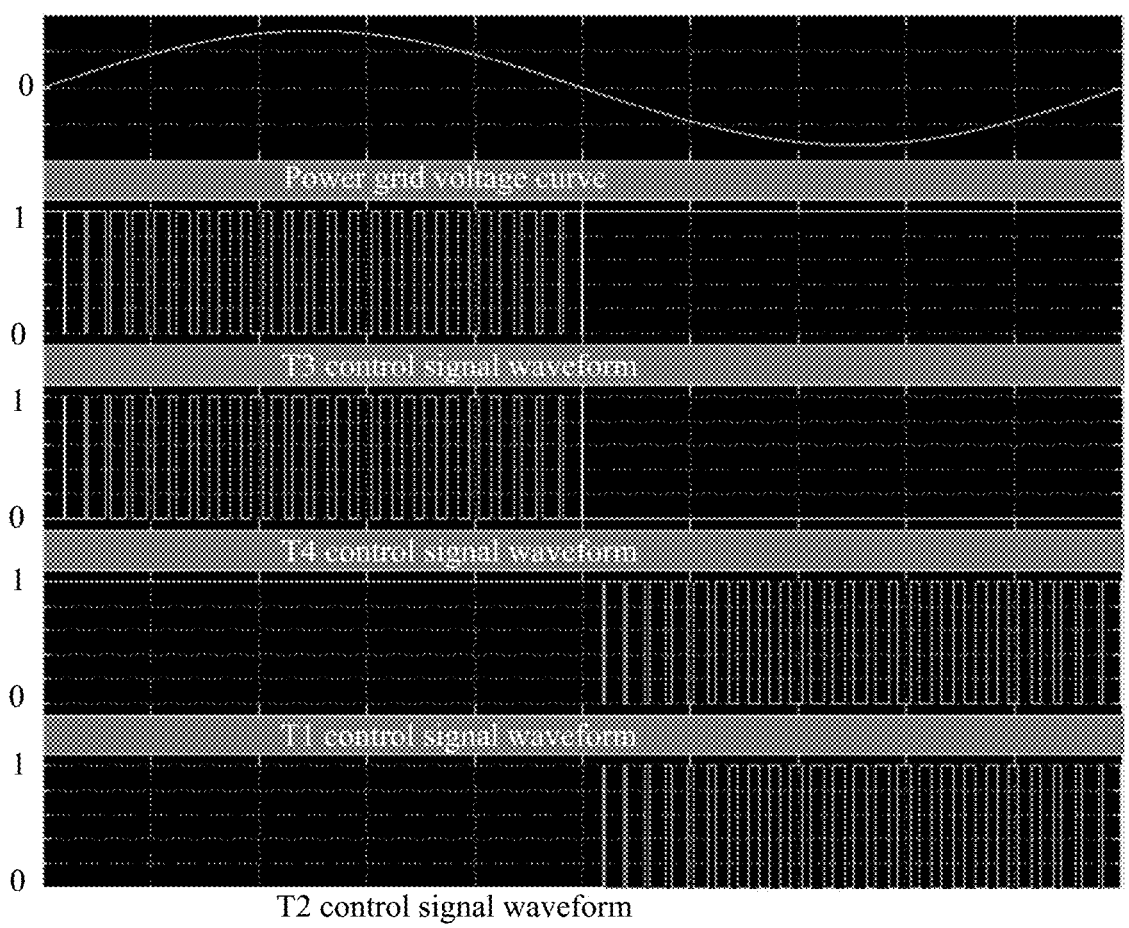
FIG. 5 is a schematic diagram of a control waveform of four switch tubes when an H bridge is controlled by adopting a first manner to charge a power battery according to an embodiment of the present disclosure.

According to an embodiment of the present disclosure, as shown in FIG. 5, if the H bridge is controlled in the first manner A to charge the power battery, and when a power grid transient voltage value supplied to the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small; when the power grid transient voltage value supplied to the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

Figure 6:
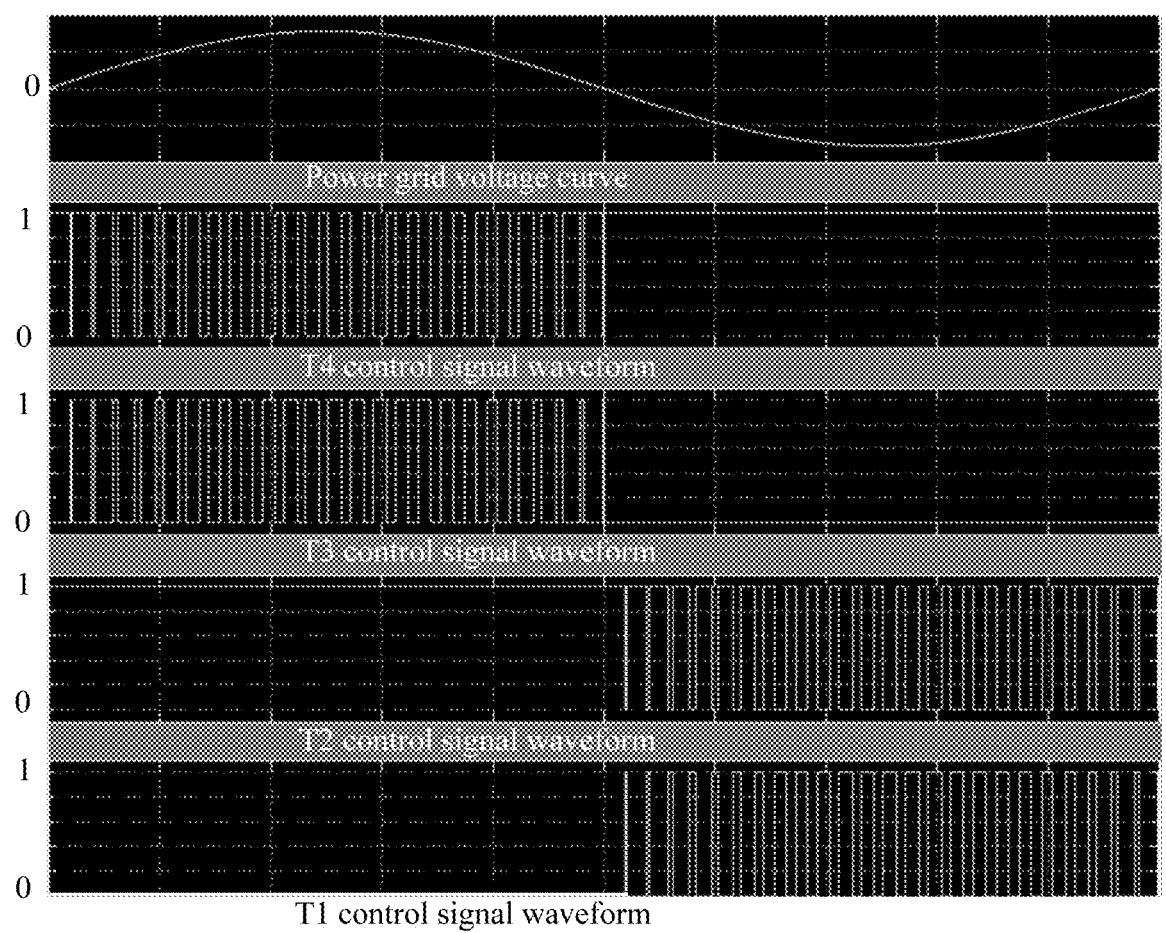
FIG. 6 is a schematic diagram of a control waveform of four switch tubes when an H bridge is controlled by adopting a second manner to charge a power battery according to an embodiment of the present disclosure.

According to an embodiment of the present disclosure, as shown in FIG. 6, if the H bridge is controlled in the second manner B to charge the power battery, and when a power grid transient voltage value supplied to the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large; when the power grid transient voltage value supplied to the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

At step S2, a relation between the first total charging period TA and the second total charging period TB is determined.

At step S3, a manner for controlling the H bridge is selected according to the relation between the first total charging period TA and the second total charging period TB to perform temperature balanced control over the first switch tube, the second switch tube, the third switch tube and the fourth switch tube.

In an embodiment, step S3 includes the followings.

At step S31, the manner from the first manner and the second manner for controlling the H bridge is selected according to the relation between the first total charging period TA and the second total charging period TB.

At step S32, the H bridge is controlled in the selected manner to perform the temperature balanced control over the first switch tube, the second switch tube, the third switch tube and the fourth switch tube.

In the process of charging the power battery by the vehicle-mounted charger, if the H bridge is only controlled by adopting the first manner A, when the power grid transient voltage value is larger than 0, the first switch tube T1 is kept ON always, the second switch tube T2 is kept OFF always, and the third switch tube T3 and fourth switch tube T4 are ON and OFF alternately and complementarily, and the inductor in the vehicle-mounted charger is charged when the third switch tube T3 is ON and the fourth switch tube T4 is OFF, and discharges when the third switch tube T3 is OFF and the fourth switch tube T4 is ON; when the power grid transient voltage value is smaller than 0, the third switch tube T3 is kept ON always, the fourth switch tube T4 is kept OFF always, and the first switch tube T1 and second switch tube T2 are ON and OFF alternately and complementarily, and the inductor in the vehicle-mounted charger is charged when the first switch tube T1 is ON and the second switch tube T2 is OFF, and discharges when the first switch tube T1 is OFF and the second switch tube T2 is ON. Since the inductor is charged when the first switch tube T1 and the third switch tube T3 are ON, the ON duty ratio is larger, therefore, the first switch tube T1 and the third switch tube T3 are overheated.

Similarly, in the process of charging the power battery by the vehicle-mounted charger, if the H bridge is only controlled by adopting the second manner B, when the power grid transient voltage value is larger than 0, the first switch tube T1 is kept OFF always, the second switch tube T2 is kept ON always, and the third switch tube T3 and fourth switch tube T4 are ON and OFF alternately and complementarily, and the inductor in the vehicle-mounted charger is charged when the fourth switch tube T4 is ON and the third switch tube T3 is OFF, and discharges when the fourth switch tube T4 is OFF and the third switch tube T3 is ON; when the power grid transient voltage value is smaller than 0, the fourth switch tube T4 is kept ON always, the third switch tube T3 is kept OFF always, and the first switch tube T1 and second switch tube T2 are ON and OFF alternately and complementarily, and the inductor in the vehicle-mounted charger is charged when the second switch tube T2 is ON and the first switch tube T1 is OFF, and discharges when the second switch tube T2 is OFF and the first switch tube T1 is ON. Since the inductor is charged when the second tube T2 and the fourth tube T4 are ON, the ON duty ratio is larger, therefore, the second switch tube T2 and the fourth switch tube T4 are overheated.

Therefore, in an embodiment of the present disclosure, the H bridge is controlled by adopting the first manner A, such that when the vehicle-mounted charger charges the power battery, the period that the H bridge is controlled in the first manner A is recorded, thus the first total charging period TA of controlling the H bridge in the first manner A is obtained, and then is stored; the H bridge is controlled by adopting the second manner B, such that when the vehicle-mounted charger charges the power battery, the period that the H bridge is controlled in the second manner B is recorded, thus the second total charging period TB of controlling the H bridge in the second manner B is obtained, and then is stored. Then, in the process of charging the power battery by the vehicle-mounted charger, the relation of the first total charging period TA and the second total charging period TB is determined. Finally, the manner of controlling the H bridge is selected according to the relation of the first total charging period TA and the second total charging period TB, thereby realizing the temperature balanced control over the first switch tube, the second switch tube, the third switch tube and the fourth switch tube.

According to an embodiment of the present disclosure, selecting the manner of controlling the H bridge according to the relation between the first total charging period TA and the second total charging period TB includes: if the first total charging period TA is larger than the second total charging period TB, the second manner B for controlling the H bridge is selected when the vehicle-mounted charger starts to charge the power battery; if the second total charging period TB is larger than the first total charging period TA, the first manner A for controlling the H bridge is selected when the vehicle-mounted charger starts to charge the power battery; and if the first total charging period TA is equal to the second total charging period TB, the first manner A or second manner B for controlling the H bridge is selected when the vehicle-mounted charger starts to charge the power battery.

That is to say, before the vehicle-mounted charger charges the power battery, the first total charging period TA that the H bridge is controlled in the first manner A as well as the second total charging period TB that the H bridge is controlled in the second manner B are obtained from a storage region and then the relation of the first total charging period TA and the second total charging period TB is determined, the first manner A for controlling the H bridge firstly or the second manner B for controlling the H bridge firstly is determined according the relation of the first total charging period TA and the second total charging period TB. In other words, the first total charging period TA and the second total charging period TB are obtained from the storage region, an aim to determine the relation of the first total charging period TA and the second total charging period TB is to determine the selected manner for controlling the H bridge firstly when the vehicle-mounted charger charges the power battery. Where, after the manner is selected during each charging cycle, the H bridge is controlled to charge the power battery according to a fixed manner, i.e., the first or second manner, the total charging period is recorded when the manner is switched, for example, when the H bridge is firstly controlled by adopting the first manner A, the first total charging period TA is recorded in this manner switching, and then the first total charging period TA is obtained from the storage region when this charging starts plus the charging period recorded in the charging cycle of this time.

Figure 7:
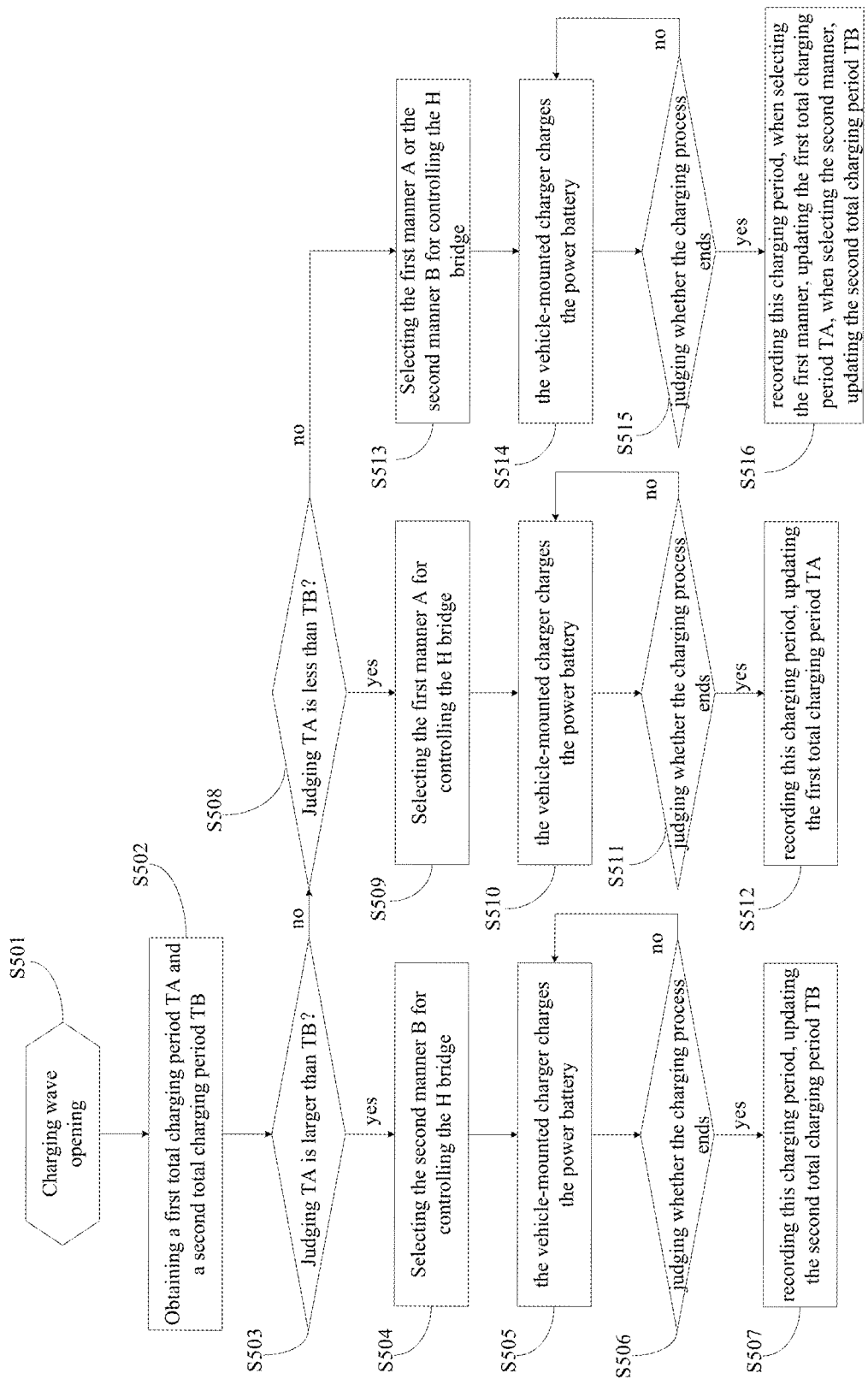
FIG. 7 is a control flow chart when a power battery is charged via a vehicle-mounted charger according to a specific embodiment of the present disclosure.

According to one embodiment of the present disclosure, as shown in FIG. 7, the method for controlling a vehicle-mounted charger of the electric vehicle includes the followings.

At step S501, a charging wave is opened, i.e., when the vehicle-mounted charger charges the power battery, a control waveform needs to be output to control the switch tubes in the H bridge.

At step S502, a first total charging period TA in a first manner A and a second total charging period TB in a second manner B are obtained.

At step S503, it is judged whether the first total charging period TA is larger than the second total charging period TB, step S504 is executed if yes, and step S508 is executed if not.

At step S504, the second manner B is selected to control the H bridge, then step S505 is executed.

At step S505, the vehicle-mounted charger charges the power battery, then step S506 is executed.

At step S506, it is judged whether the charging process ends, step S507 is executed if yes and step S505 is executed if not.

At step S507, this charging period is recorded, such that the update second total charging period TB equals to the second total charging period TB obtained from the storage region summing this charging period.

At step S508, it is judged whether the first total charging period TA is less than the second total charging period TB, step S509 is executed if yes, and step S513 is executed if not.

At step S509, the second manner B is selected to control the H bridge, then step S505 is executed.

At step S510, the vehicle-mounted charger charges the power battery, then step S511 is executed.

At step S511, it is judged whether the charging process ends, step S512 is executed if yes and step S510 is executed if not.

At step S512, this charging period is recorded, such that the update first total charging period TA equals to the first total charging period TA obtained from the storage region summing this charging period.

At step S513, the first manner A or the second manner B is selected to control the H bridge, then step S514 is executed.

At step S514, the vehicle-mounted charger charges the power battery, then step S506 is executed.

At step S515, it is judged whether the charging process ends, step S516 is executed if yes, and step S514 is executed if not.

At step S516, this charging period is recorded. In which, if the first manner A is selected, such that the update first total charging period TA equals to the first total charging period TA obtained from the storage region summing this charging period; if the second manner B is selected, such that the update second total charging period TB equals to the second total charging period TB obtained from the storage region summing this charging period.

Therefore, according to the method for controlling the vehicle-mounted charger of the electric vehicle, by recording the first manner for controlling the H bridge or the second manner for controlling the H bridge when charging every time, and then recording the first total charging period TA adopting the first manner A and the second total charging period TB adopting the second manner B, and then determining the relation of the first total charging period TA and the second total charging period TB, finally, selecting the manner for controlling the H bridge according to the relation of the first total charging period TA and the second total charging period TB, so as to perform the temperature balanced control over the first switch tube, the second switch tube, the third switch tube and the fourth switch tube, such that the heating of the first switch tube, the second switch tube, the third switch tube and the fourth switch tube is enabled to be relative balanced, and the service life of the vehicle-mounted charger is prolonged.

According to the method for controlling the vehicle-mounted charger of the electric vehicle in embodiments of the present disclosure, when the power battery is charged by the vehicle-mounted charger every time, the first total charging period TA for controlling the H bridge in the first manner A and the second total charging period TB for controlling the H bridge in the second manner B are obtained, and the manner from the first manner A and the second manner B for controlling the H bridge is selected according to the relation between the first total charging period TA and the second total charging period TB, finally, the H bridge is controlled in the first manner or the second manner, so as to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

As shown in FIGS. 1 to 3, a vehicle-mounted charger according to embodiments of the present disclosure includes an H bridge and a controller such as an MCU (Micro Control Unit). The H bridge includes a first switch tube T1, a second switch tube T2, a third switch tube T3 and a fourth switch tube T4. The controller is configured to obtain a first total charging period TA for controlling the H bridge in a first manner A and a second total charging period TB for controlling the H bridge in a second manner B when the vehicle-mounted charger starts to charge the power battery; to determine a relation between the first total charging period TA and the second total charging period TB; and to select a manner for controlling the H bridge according to the relation between the first total charging period TA and the second total charging period TB to perform temperature balanced control over the first switch tube T1, the second switch tube T2, the third switch tube T3 and the fourth switch tube T4.

In an embodiment, the controller is further configured to: select the manner from the first manner and the second manner for controlling the H bridge according to the relation between the first total charging period TA and the second total charging period TB; and control the H bridge in the selected manner to perform the temperature balanced control over the first switch tube T1, the second switch tube T2, the third switch tube T3 and the fourth switch tube T4.

According to an embodiment of the present disclosure, the controller is further configured to: select the second manner for controlling the H bridge when the first total charging period TA is larger than the second total charging period TB; select the first manner for controlling the H bridge when the first total charging period TA is less than the second total charging period TB; and select the first manner or the second manner for controlling the H bridge when the first total charging period TA is equal to the second total charging period TB.

That is to say, in an embodiment, the controller is configured to control the H bridge in the first manner A, such that when the vehicle-mounted charger charges the power battery, the period that the H bridge is controlled in the first manner A is recorded, thus the first total charging period TA of controlling the H bridge in the first manner A is obtained, and then is stored; the controller is configured to control the H bridge in the second manner B, such that when the vehicle-mounted charger charges the power battery, the period that the H bridge is controlled in the second manner B is recorded, thus the second total charging period TB of controlling the H bridge in the second manner B is obtained, and then is stored. Then, in the process of charging the power battery by the vehicle-mounted charger, the controller determines a relation of the first total charging period TA and the second total charging period TB. Finally, the manner of controlling the H bridge is selected according to the relation of the first total charging period TA and the second total charging period TB, thereby realizing the temperature balanced control over the first switch tube, the second switch tube, the third switch tube and the fourth switch tube.

According to an embodiment of the present disclosure, if the controller is configured to control the H bridge in the first manner A to charge the power battery, and when a power grid transient voltage value supplied to the vehicle-mounted charger is larger than 0, the first switch tube T1 is controlled to be ON, the second switch tube T2 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from large to small and then to large, and a duty ratio of the PWM waveform of the fourth switch tube T4 is controlled from small to large and then to small; when the power grid transient voltage value supplied to the vehicle-mounted charger is smaller than 0, the third switch tube T3 is controlled to be ON, the fourth switch tube T4 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from large to small and then to large, and a duty ratio of the PWM waveform of the second switch tube T2 is controlled from small to large and then to small.

According to an embodiment of the present disclosure, if the controller is configured to control the H bridge in the second manner B to charge the power battery, and when a power grid transient voltage value supplied to the vehicle-mounted charger is larger than 0, the second switch tube T2 is controlled to be ON, the first switch tube T1 is controlled to be OFF, and the third switch tube T3 and the fourth switch tube T4 are controlled to be ON and OFF complementarily and alternately. When the third switch tube T3 and the fourth switch tube T4 are controlled to be ON and OFF alternately and complementarily, the PWM waveform of the third switch tube T3 and the PWM waveform of the fourth switch tube T4 are controlled to be complementary with each other, and a duty ratio of the PWM waveform of the third switch tube T3 is controlled from small to large and then to small, and a duty ratio of the PWM waveform of the fourth switch tube T4 is controlled from large to small and then to large; when the power grid transient voltage value supplied to the vehicle-mounted charger is smaller than 0, the fourth switch tube T4 is controlled to be ON, the third switch tube T3 is controlled to be OFF, and the first switch tube T1 and the second switch tube T2 are controlled to be ON and OFF complementarily and alternately. When the first switch tube T1 and the second switch tube T2 are controlled to be ON and OFF alternately and complementarily, the PWM waveform of the first switch tube T1 and the PWM waveform of the second switch tube T2 are controlled to be complementary with each other, and a duty ratio of the PWM waveform of the first switch tube T1 is controlled from small to large and then to small, and a duty ratio of the PWM waveform of the second switch tube T2 is controlled from large to small and then to large.

In an embodiment of the present disclosure, as shown in FIG. 1 or FIG. 2 or FIG. 3, the first switch tube T1, the second switch tube T2, the third switch tube T3 and the fourth switch tube T4 are all IGBTs (Insulated Gate Bipolar Transistors), certainly, in other embodiments of the present disclosure, the first switch tube T1, the second switch tube T2, the third switch tube T3 and the fourth switch tube T4 can also be MOSs (Metal Oxide Semiconductors).

According to the vehicle-mounted charger of an electric vehicle in embodiments of the present disclosure, when the power battery is charged by the vehicle-mounted charger every time, the controller is configured to obtain the first total charging period for controlling the H bridge in the first manner and the second total charging period for controlling the H bridge in the second manner, and to select the manner from the first manner and the second manner for controlling the H bridge according to the relation between the first total charging period and the second total charging period, finally, to control the H bridge in the selected manner to perform the temperature balanced control over the first switch tube, the second switch tube, the third switch tube and the fourth switch tube, such that the heating of each switch tube is relatively balanced, the service life of the switch tubes in the H bridge is prolonged, and thus the service period is prolonged.

In addition, embodiments of the present disclosure also provide an electric vehicle, including the above vehicle-mounted charger of an electric vehicle.

According to the electric vehicle of embodiments of the present disclosure, the power battery is charged by the vehicle-mounted charger, so as to perform temperature balanced control over the first switch tube, the second switch tube, the third switch tube and the fourth switch tube, such that the heating of each switch tube is relatively balanced, the service life of the switch tubes in the H bridge is prolonged, therefore, the service life of the vehicle-mounted charger is prolonged.

In the description of the present disclosure, it is understandable that the directions of position relations indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "peripheral" are based on the directions or position relations as shown in the drawings, are merely convenient for describing the present disclosure and simplifying the description rather than indicating or implying the fact that devices or elements must have specific directions, or configured or operated in specific directions, and thus cannot understood as a limitation to the present disclosure.

In addition, the terms "first" and "second" merely aim to describe rather than being understood as indication or implication of relative importance or impliedly indicating a number of the indicated technical features. Therefore, the characteristics defined by "first" and "second" can clearly or impliedly comprise at least one such characteristic. In the description of the present disclosure, "more" means at least two, for example, two, three, etc., unless otherwise clearly specifically defined.

In the present disclosure, unless otherwise clearly specified and defined, the terms "mounted", "jointed", "connected", "fixed", etc., should be generalized understood, for example, the "connected" can be fixedly connected, or detachably connected, or integrated, can be mechanically connected or electrically connected, can also be directly connected or connected by an intermediate medium, and can also be internally communicated of two elements, or interacted of two elements, unless otherwise clearly defined. Those ordinary skilled in the art can understand the specific meaning of the terms in the present disclosure according to specific conditions.

In the present disclosure, unless otherwise clearly specified and defined, the case that a first characteristic is "on" or "under" a second characteristic can be the case that the first characteristic and the second characteristic are in direct contact, or in indirect contact by an intermediate medium. Besides, the case that the first characteristic is "on", "above" and "over" the second characteristic can be the case that the first characteristic is right or obliquely above the second characteristic, or only represents that the horizontal height of the first characteristic is higher than that of the second characteristic. The case that the first characteristic is "under", "below" and "beneath" the second characteristic can be the case that the first characteristic is right or obliquely below the second characteristic, or only represents that the horizontal height of the first characteristic is lower than that of the second characteristic.

In the description of the specification, the description of the reference terms "one embodiment", "some embodiments", "examples", "specific examples" or "some examples" refers to the fact that the specific characteristic, structure, material or feature described in combination with the embodiment or example is contained in the at least one embodiment or example of the present disclosure. In the present specification, and the schematic expression of the above terms unnecessarily aims at the same embodiment or example. In addition, the described specific characteristic, structure, material or feature can be combined in a proper manner in any one or more embodiments or examples. Besides, in the case without mutual contradiction, those skilled in the art can integrate or combine different embodiments or examples or the characteristics of different embodiments or examples described in the present specification.

Although the embodiments of the present disclosure have been shown and described as above, it is understandable that those ordinary skilled in the art can change, modify, substitute and transform the above embodiments in a scope of the present disclosure.

What is claimed is:

1. A method for controlling a vehicle-mounted charger of an electric vehicle, wherein the vehicle-mounted charger comprises an H bridge, and the H bridge comprises a first switch transistor, a second switch transistor, a third switch transistor and a fourth switch transistor, the method comprising:

obtaining a first total charging period (TA) for controlling the H bridge in a first manner and a second total charging period (TB) for controlling the H bridge in a second manner when the vehicle-mounted charger starts to charge a power battery;

determining a relation between the first total charging period (TA) and the second total charging period (TB); and selecting a manner for controlling the H bridge according to the relation between the first total charging period (TA) and the second total charging period (TB) to perform temperature-balanced control over the first switch transistor, the second switch transistor, the third switch transistor and the fourth switch transistor.

2. The method according to claim 1, wherein selecting a manner for controlling the H bridge according to the relation between the first total charging period (TA) and the second total charging period (TB) to perform temperature-balanced control over the first switch transistor, the second switch transistor, the third switch transistor and the fourth switch transistor comprises:

selecting the manner from the first manner and the second manner for controlling the H bridge according to the relation between the first total charging period (TA) and the second total charging period (TB); and controlling the H bridge in the selected manner to perform the temperature-balanced control over the first switch transistor, the second switch transistor, the third switch transistor and the fourth switch transistor.

3. The method according to claim 2, wherein selecting the manner from the first manner and the second manner for controlling the H bridge according to the relation between the first total charging period (TA) and the second total charging period (TB) comprises:

selecting the second manner for controlling the H bridge when the first total charging period (TA) is larger than the second total charging period (TB);

selecting the first manner for controlling the H bridge when the first total charging period (TA) is less than the second total charging period (TB); and selecting the first manner or the second manner for controlling the H bridge when the first total charging period (TA) is equal to the second total charging period (TB).

4. The method according to claim 1, wherein controlling the H bridge in the first manner comprises:

when a power grid transient voltage value supplied to the vehicle-mounted charger is larger than 0, controlling the first switch transistor to be ON, controlling the second switch transistor to be OFF, and controlling the third switch transistor and the fourth switch transistor to be ON and OFF alternately and complementarily; and when the power grid transient voltage value supplied to the vehicle-mounted charger is smaller than 0, controlling the third switch transistor to be ON, controlling the fourth switch transistor is controlled to be OFF, and controlling the first switch transistor and the second switch transistor to be ON and OFF alternately and complementarily.

5. The method according to claim 1, wherein controlling the H bridge in the second manner,
when a power grid transient voltage value supplied to the vehicle-mounted charger is larger than 0, controlling the second switch transistor to be ON, controlling the first switch transistor to be OFF, and controlling the third switch transistor and the fourth switch transistor to be ON and OFF alternately and complementarily; and
when the power grid transient voltage value supplied to the vehicle-mounted charger is smaller than 0, controlling the fourth switch transistor to be ON, controlling the third switch transistor to be OFF, and controlling the first switch transistor and the second switch transistor to be ON and OFF alternately and complementarily.

6. A vehicle-mounted charger of an electric vehicle, comprising:
an H bridge, comprising a first switch transistor, a second switch transistor, a third switch transistor and a fourth switch transistor; and
a controller, configured to obtain a first total charging period (TA) for controlling the H bridge in a first manner, and a second total charging period (TB) for controlling the H bridge in a second manner when the vehicle-mounted charger starts to charge the power battery; to determine a relation between the first total charging period (TA) and the second total charging period (TB); and to select a manner for controlling the H bridge according to the relation between the first total charging period (TA) and the second total charging period (TB) to perform temperature-balanced control over the first switch transistor, the second switch transistor, the third switch transistor and the fourth switch transistor.

7. The vehicle-mounted charger according to claim 6, wherein the controller is further configured to:
select the manner from the first manner and the second manner for controlling the H bridge according to the relation between the first total charging period (TA) and the second total charging period (TB); and
control the H bridge in the selected manner to perform the temperature-balanced control over the first switch transistor, the second switch transistor, the third switch transistor and the fourth switch transistor.

8. The vehicle-mounted charger according to claim 7, wherein the controller is further configured to:
select the second manner for controlling the H bridge when the first total charging period (TA) is larger than the second total charging period (TB);
select the first manner for controlling the H bridge when the first total charging period (TA) is less than the second total charging period (TB); and
select the first manner or the second manner for controlling the H bridge when the first total charging period (TA) is equal to the second total charging period (TB).

9. The vehicle-mounted charger according to claim 6, wherein the controller is further configured to:
control the first switch transistor to be ON, the second switch transistor to be OFF and the third switch transistor and the fourth switch transistor to be ON and OFF alternately and complementarily when a power grid transient voltage value supplied to the vehicle-mounted charger is larger than 0; and
control the third switch transistor to be ON, the fourth switch transistor to be OFF, and the first switch transistor and the second switch transistor to be ON and OFF alternately and complementarily when the power grid transient voltage value supplied to the vehicle-mounted charger is smaller than 0.

10. The vehicle-mounted charger according to claim 6, wherein the controller is further configured to:
control the second switch transistor to be ON, the first switch transistor to be OFF, and the third switch transistor and the fourth switch transistor to be ON and OFF alternately and complementarily when a power grid transient voltage value supplied to the vehicle-mounted charger is larger than 0;
control the fourth switch transistor to be ON, the third switch transistor to be OFF, and the first switch transistor and the second switch transistor to be ON and OFF alternately and complementarily when the power grid transient voltage value supplied to the vehicle-mounted charger is smaller than 0.

11. The vehicle-mounted charger according to claim 6, wherein the first switch transistor, the second switch transistor, the third switch transistor and the fourth switch transistor are IGBTs or MOSs respectively.

12. An electric vehicle, comprising:
a vehicle-mounted charger, wherein the vehicle-mounted charger comprises:
an H bridge, comprising a first switch transistor, a second switch transistor, a third switch transistor and a fourth switch transistor; and
a controller, configured to obtain a first total charging period (TA) for controlling the H bridge in a first manner, and a second total charging period (TB) for controlling the H bridge in a second manner when the vehicle-mounted charger starts to charge the power battery; to determine a relation between the first total charging period (TA) and the second total charging period (TB); and to select a manner for controlling the H bridge according to the relation between the first total charging period (TA) and the second total charging period (TB) to perform temperature-balanced control over the first switch transistor, the second switch transistor, the third switch transistor and the fourth switch transistor.

13. The electric vehicle according to claim 12, wherein the controller is further configured to:
select the manner from the first manner and the second manner for controlling the H bridge according to the relation between the first total charging period (TA) and the second total charging period (TB); and
control the H bridge in the selected manner to perform the temperature-balanced control over the first switch transistor, the second switch transistor, the third switch transistor and the fourth switch transistor.

14. The electric vehicle according to claim 13, wherein the controller is further configured to:
select the second manner for controlling the H bridge when the first total charging period (TA) is larger than the second total charging period (TB);
select the first manner for controlling the H bridge when the first total charging period (TA) is less than the second total charging period (TB); and
select the first manner or the second manner for controlling the H bridge when the first total charging period (TA) is equal to the second total charging period (TB).

* * * * *